ROWLAND, STEPHENS & MASON.
Grain Drier.
No. 12,922.
2 Sheets—Sheet 1.
Patented May 22, 1855.
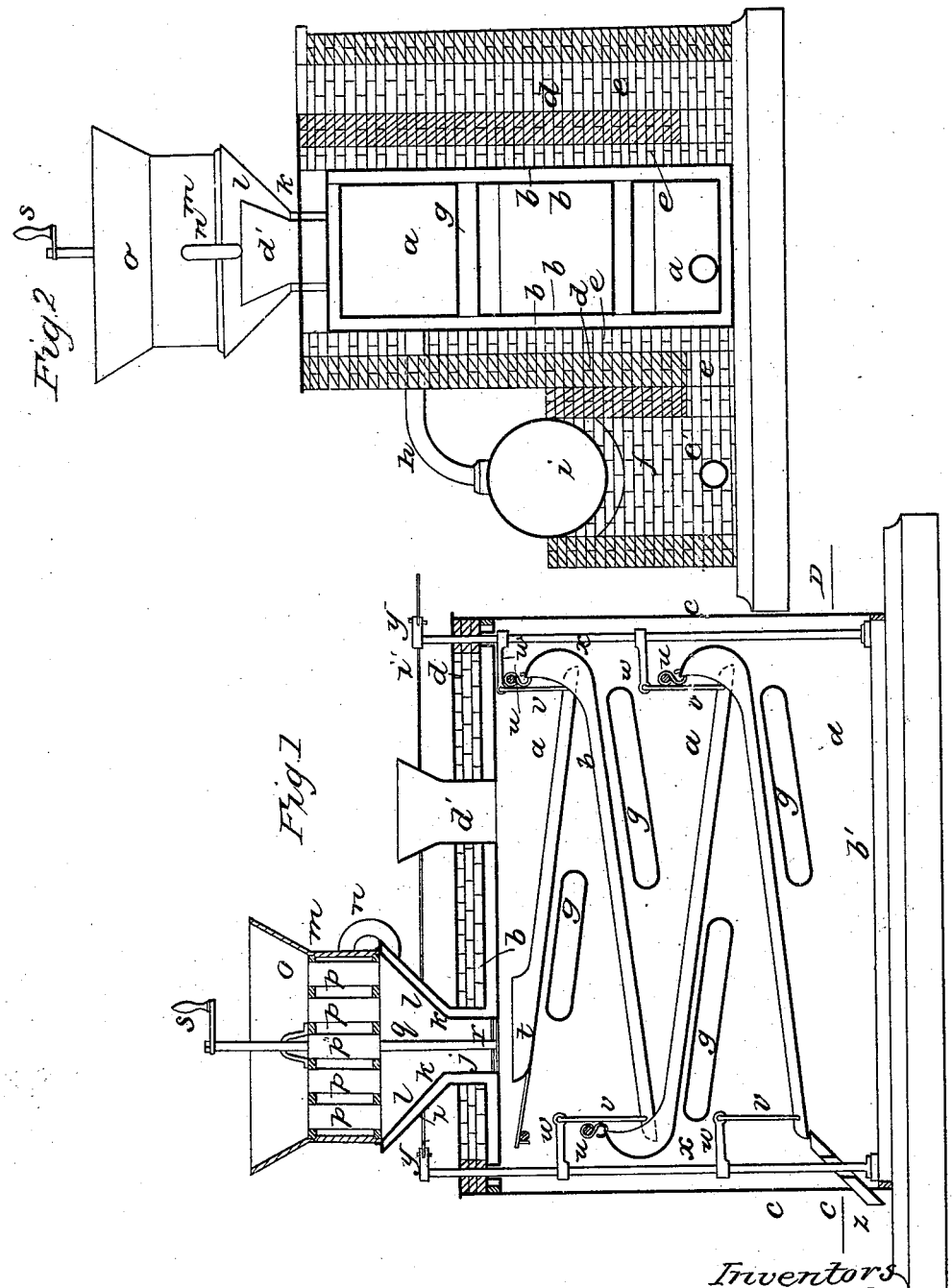
Witnesses
Wm W Bishop
Andrew De Lacy
Inventors
Thomas H Rowland
James Stephens
William H Mason ROWLAND, STEPHENS & MASON.
Grain Drier.
No. 12,922.
2 Sheets—Sheet 2.
Patented May 22, 1855.
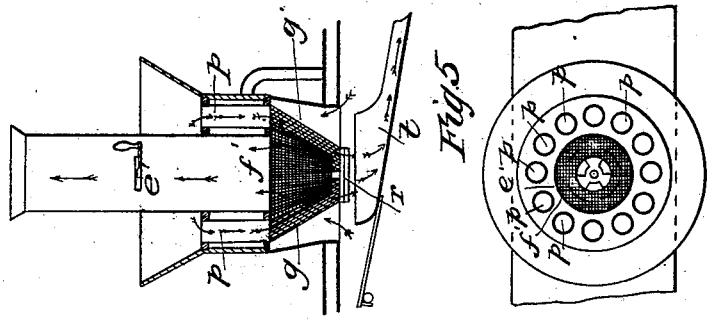
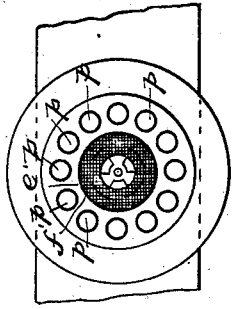
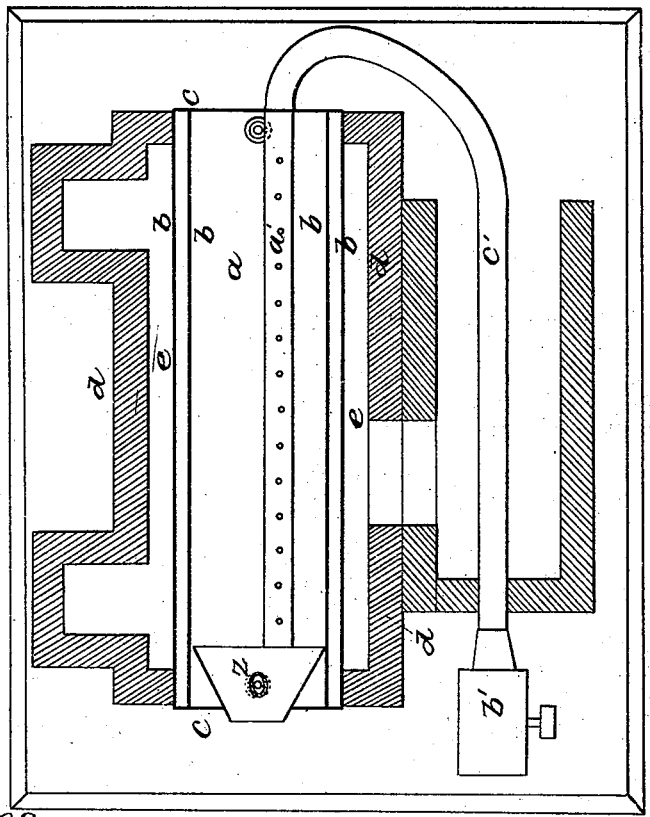

UNITED STATES PATENT OFFICE.

THOS. F. ROWLAND, JAMES STEPHENS, AND WM. H. MASON, OF BROOKLYN, NEW YORK.

APPARATUS FOR DRYING GRAIN.

Specification of Letters Patent No. 12,922, dated May 22, 1855.

*To all whom it may concern:*

Be it known that we, THOMAS F. ROWLAND, JAMES STEPHENS, and WILLIAM H. MASON, of the city of Brooklyn, in the county of Kings and State of New York, have invented certain new and useful Improvements in Apparatus for Kiln-Drying Grain and other Substances, of which the following is a full, clear, and exact description, reference being had to the accompanying drawings, making part of this specification, in which—

Figure 1, a longitudinal vertical section; Fig. 2, a cross vertical section; and Fig. 3, a horizontal section taken at the line C, D, of Fig. 1.

The same letters indicate like parts in all the figures.

Our invention is mainly intended for kiln drying, and at the same time cleaning all kinds of grain, but which is applicable to other substances such as salt and malt. And our said invention consists in combining with the bottom of the feeding hopper a series of vertical tubes surrounded with steam or hot water, through which the grain or other substances to be dried passes on its way to the pans and by which it is partly heated preparatory to the final kiln drying. And our invention also consists in forming the kiln of a metallic steam or hot water casing surrounding the series of pans and inclosed by brick work or other masonry, the said surrounding steam or hot water casing being provided with pipes which extend across the kiln and under the series of pans so that the steam or hot water circulating through the said casing and cross pipes shall heat the grain or other substances passing over the pans, and effectually prevent the injurious effects hereinafter experienced by the condensation of the vapors by the surrounding walls. And our invention also consists in the employment in combination of a blast of heated air which is forced in at or near the bottom of the kiln, and discharged at top, and which in its passage upward, through and around the pans, effectually carries off the moisture discharged from the grain or other substances.

In the accompanying drawings $a$, represents the kiln or drying chamber surrounded by a double metallic casing $b$, the inside and outside of which at the bottom, tow and sides are so far apart as to form a continuous chamber for the circulation of steam, or if preferred hot water. The ends $c$, $c$, if desired, may be also made double, but that is deemed unnecessary. The bottom, top and sides are surrounded with brick work, or other masonry $d$, with the flues $e$, for the furnace $f$, formed at the sides between the metallic casing and the walls, so that the heated products of the combustion passing through these flues shall aid in keeping up the temperature to prevent condensation. The sides of this casing are connected by flat tubes $g$, one under each pan running horizontally from side to side, and having the same inclination as the pans in the direction of the length of the kiln. Steam is supplied to this casing and the tubes by a pipe $h$, from a suitable steam boiler $i$, placed over the furnace. And at the top and near one end there is a hole $j$, of suitable size through which the grain passes to the pans. And this whole is surrounded by a double cylindrical casing $k$, which spreads out funnel shape as at $l$, and this communicates with the double casing $b$, for the free circulation of steam. The funnel $l$, is surrounded by a flat cylinder $m$, which also receives steam by a pipe $n$, from the double casing. The upper head of this cylinder $m$, forms the bottom of a hopper $o$, that holds the grain or other substances to be dried, which passes to the kiln through a series of vertical pipes $p$, extending from and secured to the two heads of the cylinder. One of the pipes is placed in the center, and through it passes a vertical spindle $q$, which at the lower end carries a register $r$, to regulate the passage of the grain to the pans, the said spindle being provided with a crank handle $s$, at top by which an attendant can regulate the position of the register valve to increase of decrease the supply of grain to the pans according to the degree of heat and the quantity of moisture in the grain or other substance. The grain falls from the register onto the upper end of the first inclined pan $t$, formed with sides of sheet metal or other suitable substance and with the bottom of wire cloth. The lower and fixed pan discharges the grain onto the upper end of the second inclined pan $t'$, made in like manner and inclined in the reverse direction. The second discharges onto the third, and the third onto the fourth, and so on through a series of greater number if desired, although we have found four to be sufficient. These pans extend from end to end, and are alternately inclined in opposite directions. The upper end of each is suspended by links $u$, or otherwise so as to be free to vibrate, and the lower end is suspended by a link $v$, to an arm $w$, on a vertical shaft $x$, there being two such shafts one at each end, and each with two arms $w$. These shafts extend up through the top of the kiln and are there provided each with an arm $y$, by which the shafts are vibrated by any suitable means, the two arms being linked together by a connecting rod $i'$, so that by the vibration of these shafts the lower ends of all the pans receive the same extent of vibration to cause the grain to descend on their inclined and seive like bottom. The lowest pan discharges the grain in a dried state into a spout $z$, which extends through the end of the kiln.

At the bottom of the kiln there is a horizontal wind pipe $a'$, pierced with numerous small holes along the top, and this communicates with a fan blower $b'$, by means of a pipe $c'$, which passes under the furnace, or if preferred around the fire chamber of the furnace, or in any other desired and suitable manner for heating the air as it passes from the blower to the pipe in the kiln where it is forced out through the numerous holes, thus producing a blast of heated air upward through the kiln to aid in drying the grain and to carry off the vapors given out by the drying grain. A suitable hole $d'$, is provided at top for the escape of the blast. Or, instead of the escape hole $d'$, at top the hopper may be arranged in manner represented in the sectional Figs. 4 and 5 with a large central pipe $e'$, for the escape of the heated blast so that in escaping it shall pass through the descending grain. For this purpose there is an inverted conical frustum $f'$, made of wire gauze surrounding the lower end of the pipe $e'$, and another like frustum $g'$, outside of the first and surrounding the series of vertical pipes $p$. The grain descends in the space between the two frustums, and the blast escapes through the meshes and the grain. In this way the grain supplied to the hopper is gradually heated in passing through the tubes in the bottom of the hopper, and also in passing through the funnel casing below, and then in passing down over the series of pans it is continually exposed to the gentle heat given out by the series of pipes under the pan which evaporates the moisture, and as the sides, bottom and top of the surrounding casing are heated, the vapors given off are not condensed, but are carried off by the blast of heated air, which at the same time in passing through the meshes of the bottoms of the pans not only carries off the moisture more effectually and aids in drying the grain, but aids in keeping it in a state of agitation and blows off all foreign light matter. We are thus enabled to dry grain and other substances more effectually at a lower temperature, in less time and consequently with less danger of injury than by any other plan before known.

We do not confine ourselves to the use of steam for heating as hot water may be made to circulate through the apparatus instead of steam. Nor do we wish to be understood as confining ourselves to the special form or construction herein specified so long as the same results are attained by equivalent means.

What we claim as our invention and desire to secure by Letters Patent is—

1. The heating tubes substantially as herein specified, in combination with the hopper as specified for partially heating the grain or other substance as it passes to the kiln.

2. We also claim in combination with the series of perforated or wire gauze shaking pans, the surrounding double metallic casing the opposite sides of which are connected by horizontal tubes passing under the pans, and connected with a steam boiler for the circulation of hot water or steam through the whole casing and connecting tubes substantially as specified, the said double casing being surrounded by masonry as specified, the said combination being for the purpose of more effectually and economically drying grain or other substances without the danger of scorching or overheating it, and to avoid the condensation of the vapors evolved from the grain or other substance, which if permitted to take place within the kiln not only moistens the grain but is otherwise injurious.

3. And we also claim in combination with a kiln consisting of the double casing connected with a steam boiler, and surrounding the perforated or wire gauze shaking pans, substantially as specified, the employment of a blast of heated air introduced at the bottom and forced to pass upward through the kiln and through the perforations in the pans and to escape at top, substantially as specified, for the purpose of driving off moisture and vapors evolved from the grain, or other substance, as specified.

THOMAS F. ROWLAND.
JAMES STEPHENS.
WILLIAM H. MASON.

Witnesses:
WM. H. BISHOP,
ANDREW DE LACY.